(12) United States Patent
Pruemm

(10) Patent No.: US 9,243,579 B2
(45) Date of Patent: Jan. 26, 2016

(54) METHOD FOR OPERATING AN AUTO-IGNITION INTERNAL COMBUSTION ENGINE

(71) Applicant: MAN Truck & Bus AG, Munich (DE)

(72) Inventor: Franz Werner Pruemm, Nuremberg (DE)

(73) Assignee: MAN TRUCK & BUS AG, Munich (DE)

(*) Notice: Subject to any disclaimer, the term of this patent is extended or adjusted under 35 U.S.C. 154(b) by 221 days.

(21) Appl. No.: 13/767,312

(22) Filed: Feb. 14, 2013

(65) Prior Publication Data

US 2013/0213363 A1  Aug. 22, 2013

(30) Foreign Application Priority Data

Feb. 16, 2012 (DE) .................... 10 2012 002 948

(51) Int. Cl.
*F02D 19/08* (2006.01)
*F02D 41/30* (2006.01)
(Continued)

(52) U.S. Cl.
CPC .............. *F02D 41/3011* (2013.01); *F02B 7/08* (2013.01); *F02B 37/18* (2013.01); *F02D 19/0647* (2013.01); *F02D 19/0692* (2013.01); *F02D 19/10* (2013.01); *F02D 19/105* (2013.01); *F02D 41/005* (2013.01); *F02D 41/0007* (2013.01); *F02D 41/0025* (2013.01); *F02D 41/402* (2013.01); *F02M 21/0218* (2013.01); *F02M 21/0245* (2013.01); *F02M 25/0707* (2013.01); *F02M 25/0711* (2013.01); *F02D 19/0642* (2013.01); *F02D 19/0673* (2013.01); *F02D 41/0027* (2013.01); *F02D 41/0055* (2013.01); *F02D 41/1456* (2013.01);

*F02D 41/266* (2013.01); *F02D 41/403* (2013.01); *F02D 41/405* (2013.01); *F02D 2009/0237* (2013.01);
(Continued)

(58) Field of Classification Search
CPC ............ F02D 41/3011; F02D 19/0673; F02D 19/0692; F02D 19/0642; F02D 19/0647; F02D 19/08; F02D 19/081; F02D 19/085; F02D 19/105; F02M 21/047
USPC ............. 123/1 A, 27 GE, 299, 300, 304, 491, 123/525, 526, 527, 568.11, 568.12, 568.19, 123/568.21, 575, 576, 577, 578, 672, 683, 123/698, 699; 701/108; 60/284, 285, 303
See application file for complete search history.

(56) References Cited

U.S. PATENT DOCUMENTS 4,178,903 A * 12/1979 Yanagihara et al. .......... 123/259
4,612,905 A *  9/1986 Dietrich et al. ............... 123/575
(Continued)

FOREIGN PATENT DOCUMENTS

DE     10 2007 022 230 A1    11/2008

*Primary Examiner* — Thomas Moulis
(74) *Attorney, Agent, or Firm* — Lucas & Mercanti, LLP

(57) ABSTRACT

A method for operating an auto-ignition internal combustion engine that is operable in a single substance mode in which the internal combustion engine is supplied with self-igniting liquid fuel, and a dual substance mode in which the internal combustion engine is supplied with the liquid fuel as an ignition agent and gaseous or liquid alternative fuel, includes operating the internal combustion engine in the dual-substance mode at an increased exhaust gas recirculation rate relative to the single-substance mode, and throttling an air supply in an intake system of the internal combustion engine such that a lambda value in an exhaust gas of the internal combustion engine is in a range greater than 1 up to 1.3.

19 Claims, 3 Drawing Sheets

(51) Int. Cl.
   *F02D 41/40* (2006.01)
   *F02M 25/07* (2006.01)
   *F02D 19/10* (2006.01)
   *F02D 41/00* (2006.01)
   *F02M 21/02* (2006.01)
   *F02B 7/08* (2006.01)
   *F02B 37/18* (2006.01)
   *F02M 21/04* (2006.01)
   *F02D 19/06* (2006.01)
   *F02D 9/02* (2006.01)
   *F02D 41/14* (2006.01)
   *F02D 41/26* (2006.01)

(52) U.S. Cl.
   CPC ...... *F02D 2041/0017* (2013.01); *F02M 21/047* (2013.01); *Y02T 10/144* (2013.01); *Y02T 10/32* (2013.01); *Y02T 10/36* (2013.01); *Y02T 10/44* (2013.01); *Y02T 10/47* (2013.01)

(56) References Cited

U.S. PATENT DOCUMENTS

| | | | |
|---|---|---|---|
| 4,635,609 A * | 1/1987 | Seppen et al. | 123/698 |
| 7,201,137 B2 * | 4/2007 | Kesse et al. | 123/299 |
| 7,257,950 B2 * | 8/2007 | Iwaszkiewicz | 60/605.2 |
| 8,146,541 B2 * | 4/2012 | Surnilla | F02D 19/0644 123/1 A |
| 8,230,843 B2 * | 7/2012 | Kurtz | 123/568.12 |
| 8,307,790 B2 * | 11/2012 | Leone | F02B 43/12 123/1 A |
| 8,327,823 B2 * | 12/2012 | Courtoy et al. | 123/299 |
| 8,412,439 B2 * | 4/2013 | Warner et al. | 701/103 |
| 8,464,699 B2 * | 6/2013 | Pursifull | F01N 5/02 123/1 A |
| 8,613,263 B2 * | 12/2013 | Leone et al. | 123/3 |
| 8,689,553 B2 * | 4/2014 | Johnson et al. | 60/605.2 |
| 2002/0007816 A1 * | 1/2002 | Zur Loye et al. | 123/295 |
| 2004/0182359 A1 * | 9/2004 | Stewart et al. | 123/295 |
| 2005/0217649 A1 * | 10/2005 | Shimazaki et al. | 123/568.14 |
| 2005/0223699 A1 * | 10/2005 | Ancimer | F01N 3/0871 60/286 |
| 2006/0180121 A1 * | 8/2006 | Wickman et al. | 123/299 |
| 2006/0219215 A1 * | 10/2006 | Brachert et al. | 123/299 |
| 2008/0156293 A1 * | 7/2008 | Huang | 123/299 |
| 2009/0266344 A1 * | 10/2009 | Alger et al. | 123/568.11 |
| 2009/0301431 A1 * | 12/2009 | Kawarabayashi et al. | 123/299 |
| 2014/0076291 A1 * | 3/2014 | Wong | 123/568.11 |
| 2014/0299105 A1 * | 10/2014 | Hou | 123/478 |

* cited by examiner

METHOD FOR OPERATING AN AUTO-IGNITION INTERNAL COMBUSTION ENGINE

CROSS-REFERENCE TO RELATED APPLICATIONS

This application claims the priority of DE 10 2012 002 948.9 filed Feb. 16, 2012, which is incorporated by reference herein.

BACKGROUND OF THE INVENTION

1. Field of the Invention

The present invention relates to a method for operating an auto-ignition internal combustion engine and to an internal combustion engine for carrying out the method.

2. Description of Prior Art

A method of the type in question is described by DE 10 2007 022 230 A1, in which an auto-ignition internal combustion engine is supplied with diesel oil in a single-substance mode and, in a dual-substance mode, is supplied with diesel oil to produce an ignition jet and with a gaseous or liquid alternative fuel, e.g. natural gas, biogas, methanol, ethanol etc. In diesel mode, it is desirable for reasons of efficiency that the internal combustion engine should be operated with pressure charging, in particular exhaust turbocharging, in which case boost pressure control is to be provided with a bypass line and a bypass valve. Here, an exhaust gas recirculation system containing a controlled exhaust gas recirculation valve serves primarily to lower the NOx values in the exhaust gas. Oxidation catalysts are furthermore usually employed in the exhaust system, eliminating inter alia the precipitation of soot particles in the exhaust gas.

SUMMARY OF THE INVENTION

It is an object of the invention to propose a method of the type in question by means of which it is possible to meet the requirements for the achievement of low exhaust gas limits, even in the dual-substance mode of the internal combustion engine, with a low additional outlay. In addition, the intention is to specify an internal combustion engine for carrying out the method which is advantageous in terms of construction and control engineering.

According to the invention, it is proposed that, in dual-substance mode, the internal combustion engine is operated at an increased exhaust gas recirculation rate and, furthermore, the air supply in the intake system is throttled in such a way that a lambda value greater than 1 and up to 1.3, preferably greater than 1 and up to 1.2, most preferably 1.03 to 1.1, in particular around 1.05, is obtained in the exhaust gas. The proposed measures are an effective way of lowering nitrogen oxide emissions (NOx); hydrocarbon emissions (HC) are also significantly lowered. Moreover, throttling the combustion air to said lambda value raises the exhaust gas temperature to such an extent that a downstream oxidation catalyst can provide rapidly initiated, effective conversion of the HC and CO components in the exhaust gas. Operation with natural gas, containing methane as the principal component, represents a major challenge, in particular. The methane which is not burnt during the working process is a very stable compound which cannot be oxidized using conventional diesel oxidation catalysts. Special methane oxidation catalysts require high operating temperatures of over 450° C. The exhaust gas temperatures of modern diesel engines are significantly lower than these values. In order to ensure the effectiveness of an oxidation catalyst, it is also crucial that the lambda value specified (superstoichiometric fuel/air ratio) should ensure the presence of sufficient oxygen in the exhaust gas to allow oxidation of HC and CO.

As a preferred option, the throttling of the air supply can be accomplished by means of a throttle valve in the intake system, which throttle valve is controlled inter alia in accordance with the signal of at least one lambda probe inserted in the exhaust system. Thus, as a departure from the general practice, the lambda probe does not control fuel metering—this can be metered in in a constant fashion in accordance with a characteristic map—but the admixture of combustion air in order to set the lambda value.

It is furthermore proposed that the exhaust gas recirculation rate in dual-substance mode is 40% or more of the air quantity supplied, i.e. is significantly increased as compared with diesel mode. In particular, this measure brings about a significant reduction in nitrogen oxide emissions and obviates the risk of combustion anomalies, such as knocking and premature auto-ignition.

Owing to the thermodynamic differences in the combustion process in the combustion chambers of the internal combustion engine, it is furthermore advantageous if the boost pressure of the pressure-charging device is reduced to a predetermined extent, preferably permanently, in the dual-substance mode of the internal combustion engine, preferably however, in the case of an internal combustion engine with exhaust turbocharging by means of at least one turbocharger, is cut back greatly by, preferably permanent, opening of the at least one bypass valve. Since the system is not operated with a large excess of air in dual-substance mode, this measure makes it possible to reduce the exhaust gas backpressure by bypassing the at least one exhaust turbine (improved gas exchange).

In the dual-substance mode of the internal combustion engine, an additional advantageous influence on the combustion processes can be exerted by dividing the liquid fuel quantity metered in into a pilot injection and a main injection or into a main injection and a post-injection or into a pilot injection, a main injection and a post-injection, wherein the main injection should always be carried out before the top dead centre position (TDC) of the respective cylinder.

In this case, a liquid fuel main injection can preferably be carried out at least 15 degrees before TDC of the respective cylinder at low load (preferably defined as up to about 40% of the maximum possible torque), and a liquid fuel main injection can be carried out at about 2 to 5 degrees before TDC of the respective cylinder at a load that is high in comparison therewith (preferably defined as greater than 80% of the maximum possible torque). Moreover, 70 to 90%, in particular approximately 80%, of the respectively required liquid fuel should be injected in a main injection.

Moreover, the injection device can be used to carry out a pilot injection of liquid fuel in dual-substance mode, thereby reducing the gradient of the pressure rise in the combustion chambers of the internal combustion engine. At the same time, a post-injection can contribute to improvements in the progress of combustion of the charge and accordingly to reduced soot formation.

In terms of the method, it is furthermore proposed that the internal combustion engine is operated only in single-substance mode in the cold-starting phase and/or at idle in order to ensure stable running characteristics and low exhaust gas limits in the cold-running range.

The exhaust gases of the exhaust gas recirculation system entering the intake system of the internal combustion engine can be cooled as known per se in single-substance mode, and can be cooled to a lesser extent or not at all in dual-substance mode in order to produce, in particular, homogenization of the charge supplied and an increase in the exhaust gas temperature in dual-substance mode. In dual-substance mode, the exhaust gas temperature of the recirculated exhaust gas can be increased by activating a shorter recirculation line or reducing the cooling function of an EGR cooler integrated into the recirculation line. Both measures are relatively simple to implement in terms of construction and control engineering.

As an alternative or in addition, it is furthermore possible, in the case of an internal combustion engine having a charge air cooler, for the cooling function of the charge air cooler to be reduced or interrupted in dual-substance mode.

The internal combustion engine according to the invention is characterized in that, in dual-substance mode, the internal combustion engine is operated at a higher exhaust gas recirculation rate than in single-substance mode through modified control of the exhaust gas recirculation valve and, furthermore, the air supply in the intake system is throttled in such a way by means of a controllable throttling element that a lambda value greater than 1 and up to 1.3, preferably greater than 1 and up to 1.2, most preferably 1.03 to 1.1, in particular around 1.05, is obtained in the exhaust gas. In particular, the air supply can be adjusted in dual-substance mode by way of the throttling element by means of at least one lambda probe arranged in the exhaust system, while the fuel supply remains constant in each case.

The lambda probe can preferably be a wide-band lambda probe having a measurement range of between 0.7 and 4 in order to ensure reliable adjustment of the throttling element or throttle valve in the intake system to the desired lambda value over the entire operating range of the internal combustion engine.

In a modification that is simple in terms of control engineering, the boost pressure in the boost pressure line of the intake system can be controlled by means of at least one bypass valve, which bypasses an exhaust turbine, and a bypass line in the single-substance mode of the internal combustion engine, while the bypass valve is more or less permanently open in dual-substance mode, and no boost pressure control takes place, as already described above.

If a gas is used as an alternative fuel, a particularly preferred option is for the gas mixer to be arranged downstream of the throttle valve as an annular-gap mixer around the common boost pressure line, and, if appropriate, the outlet of the exhaust gas recirculation line can be integrated into the annular-gap mixer in order to produce homogeneous mixing of the combustion air, the gas and the recirculated exhaust gas even outside the combustion chambers of the internal combustion engine while achieving structurally compact dimensions.

Finally, in a preferred embodiment of the invention, two interlinked electronic engine control units can be used, of which one controls the metering of the liquid fuel in single-substance mode, the boost pressure, the exhaust gas recirculation etc. in a conventional manner, and the second engine control unit controls the metering of both types of fuel, the throttle valve in accordance with the lambda values in the exhaust system, the increased exhaust gas recirculation by means of the recirculation valve, the reduction of the boost pressure by opening the bypass valve and, if appropriate, the exhaust gas temperature by way of the exhaust gas recirculation system and the cooling thereof as presented in the method claims.

BRIEF DESCRIPTION OF THE DRAWING

An illustrative embodiment of the invention is explained in greater detail below with reference to the drawings, in which.

DETAILED DESCRIPTION OF THE PREFERRED EMBODIMENTS

Figure 1:
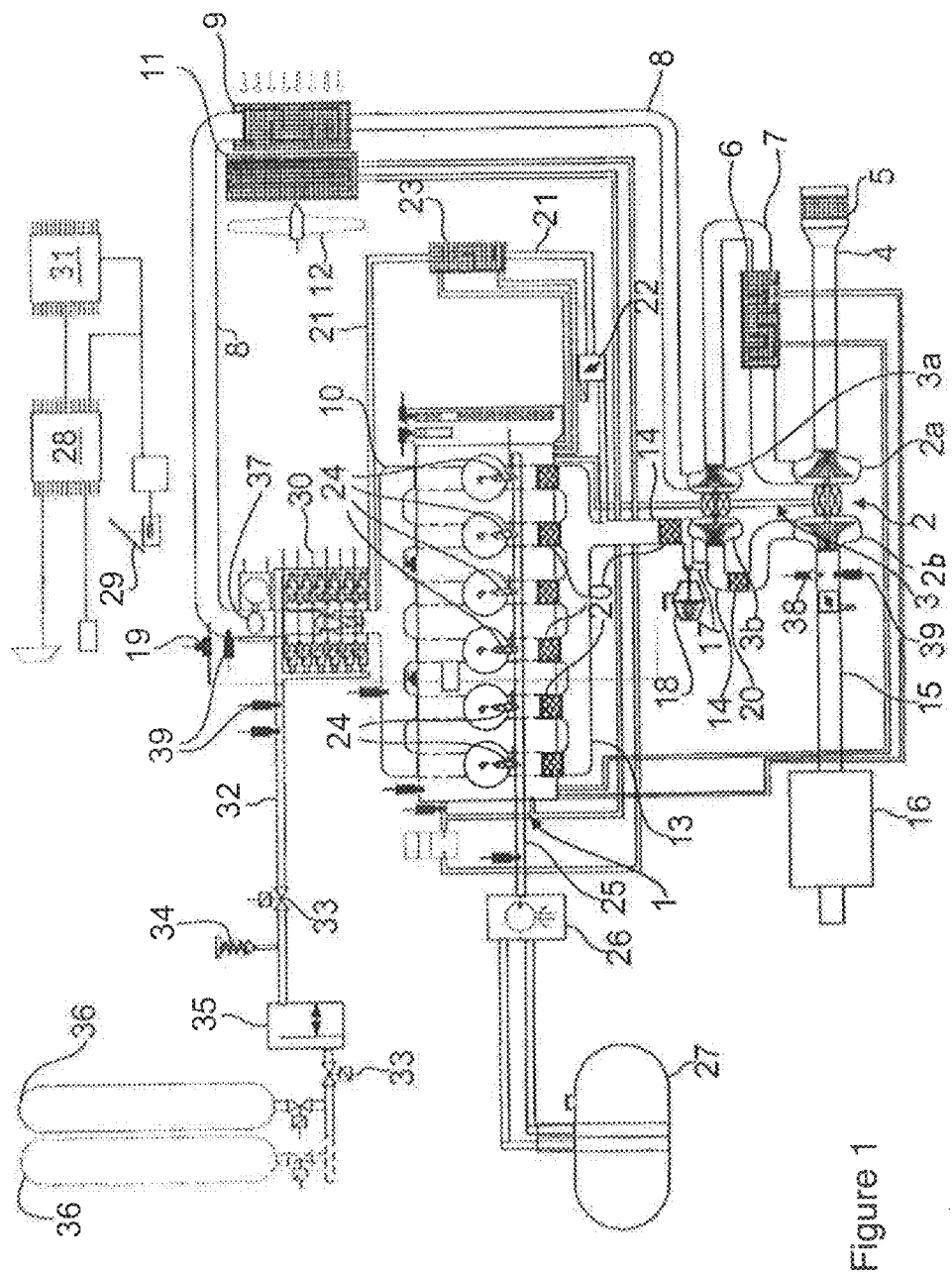
FIG. 1 is a schematic illustration of an internal combustion engine for diesel operation and dual-substance operation.

An auto-ignition six-cylinder reciprocating-piston four-stroke internal combustion engine 1 for a motor vehicle, in particular a commercial vehicle, is illustrated in FIG. 1 to the extent necessary for an understanding of the invention, it being possible to operate said engine with a liquid fuel or diesel oil in single-substance mode and with diesel oil as a source of ignition and an alternative fuel or, in this case, natural gas ($CH_4$) in a dual-substance mode.

The internal combustion engine 1 has a staged pressure-charging device comprising two exhaust turbochargers 2, 3, which are arranged in series and designed as a low-pressure stage and a high-pressure stage.

In this arrangement, the compressor 2a of the low-pressure stage draws in combustion air via an intake line 4 and an air filter 5 and delivers it, if appropriate via an intercooler 6 connected to the cooling system (not shown specifically) of the internal combustion engine 1, to a connecting line 7 leading to the second compressor 3a of the high-pressure stage. From there, the compressed combustion air is fed to the intake manifold 10 via the boost pressure line 8 containing an integrated charge air cooler 9 and, finally, via the gas exchange valves (not shown), to the combustion chambers of the internal combustion engine 1.

The charge air cooler 9 is mounted on the cooler 11 of the cooling water system of the internal combustion engine 1, for example, the flow of cooling air through said cooler 11 being accomplished by means of dynamic pressure during driving and by means of a temperature-controlled, electrically operated fan 12.

On the exhaust gas side, the internal combustion engine 1 has an exhaust manifold 13, which is connected to the combustion chambers by exhaust ducts (without a reference sign) and to which the exhaust turbine 3b of the high-pressure stage and then the exhaust turbine 2b of the low-pressure stage are connected by a common exhaust line 14.

From the exhaust turbine 2b, the exhaust gas is discharged to the atmosphere via an outgoing exhaust line 15 and at least one silencer 16.

Arranged on the high-pressure exhaust turbine 3b is a bypass line 17, which is connected to the exhaust line 14 upstream and downstream of the exhaust turbine 3b, bypassing the exhaust turbine 3b. The flow through the bypass line 17 can be controlled by means of a bypass valve 18, the bypass valve 18 being actuated by means of an electric duty-cycle valve 19 in accordance with the boost pressure in the boost pressure line 8. In the single-substance mode of the internal combustion engine 1, the bypass valve 18 is actuated in a known manner to control the boost pressure.

As an alternative or in addition, a bypass valve of this kind can also be provided in a similar way at the low-pressure exhaust turbine 2b.

$CH_4$ oxidation catalysts 20 are inserted in the exhaust manifold 13 or in the exhaust ducts leaving the combustion chambers of the internal combustion engine 1; additional CH4 oxidation catalysts 20 are furthermore provided in the exhaust line 14 upstream of the exhaust turbines 3b, 2b, said catalysts oxidizing HC and CO components in the exhaust gas to H2O and CO2, given appropriate oxygen saturation, above the light-off temperature thereof of about 450 degrees C.

The internal combustion engine 1 is furthermore provided with an external exhaust gas recirculation device, which consists of a recirculation line 21, a recirculation valve 22 and an exhaust gas cooler 23 connected to the cooling system of the internal combustion engine 1. The recirculation line 21 is connected at one end to the exhaust line 14 and, at the other end, to the boost pressure line 8. The exhaust gas recirculation rate can be determined to the desired degree by appropriate control of the recirculation valve 22.

To operate the internal combustion engine 1 in single-substance mode or diesel mode, a fuel injection device (e.g. common rail) is provided in a known manner, essentially having one injection nozzle 24 per cylinder, injecting fuel into the combustion chamber, a common fuel feed line 25 and a high-pressure pump 26, which produces the pressure necessary for injection. The injection time and quantity of the electrically controlled injection valves 24 is determined by means of a first electronic engine control unit 28 in accordance with a load signal (accelerator pedal 29), according to engine speed and temperature signals (not explained in detail) etc., using characteristic map control.

For the dual-substance mode of the internal combustion engine 1, a gas mixer or annular-gap mixer 30 as a feed device for the natural gas is integrated into the boost pressure line 8 close to the intake manifold 10, the gas injection valves (without a reference sign) of which mixer are controlled by means of a second electronic engine control unit 31 as regards the gas injection quantity.

The annular-gap mixer 30, into which the outlet of the exhaust gas recirculation line 21 can likewise be integrated, close to the intake manifold 10, is connected by a gas line 32 containing pressure and temperature sensors 39, two shut-off valves 33, a pressure relief valve 34 and a gas pressure regulator 35 to (in this case preferably a plurality of) high-pressure natural gas tanks 36 and is supplied by the latter with natural gas as an alternative fuel in dual-substance mode.

Figure 3:
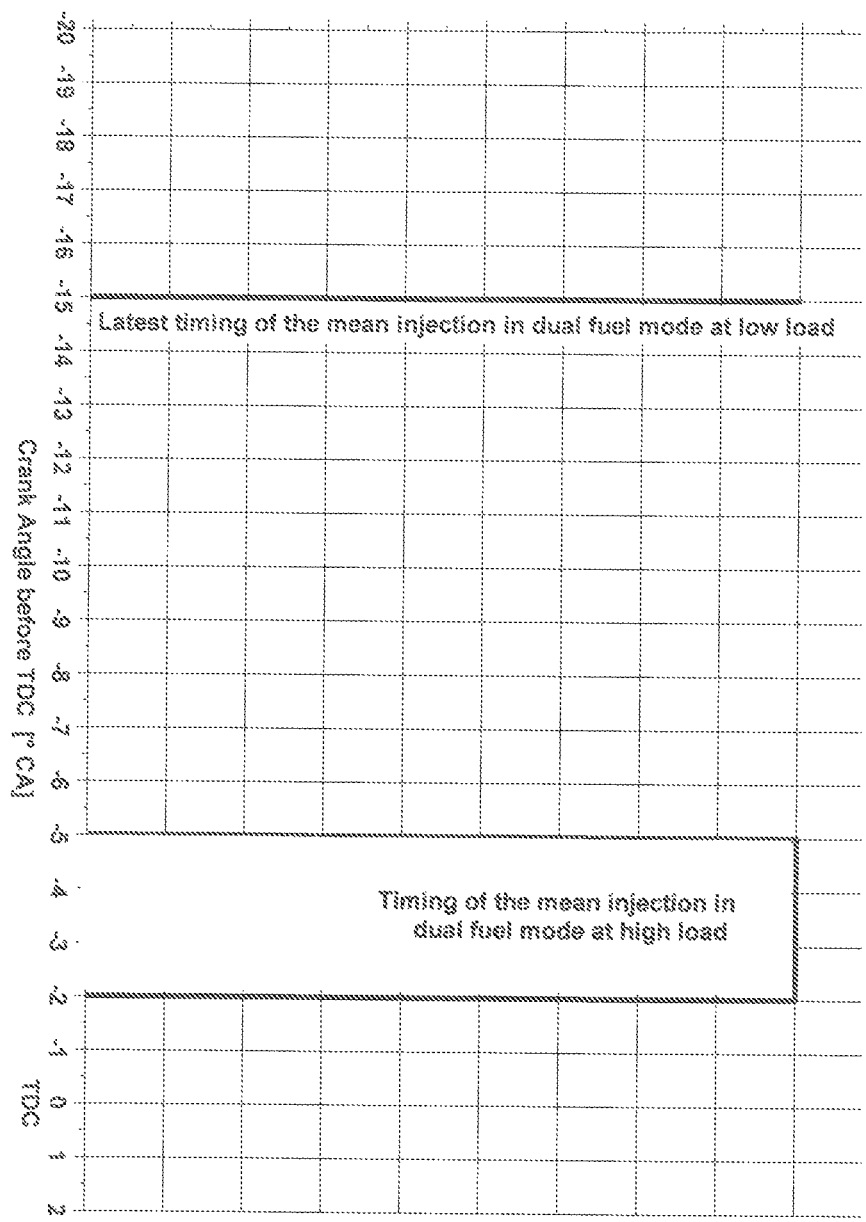
FIG. 3 is a graph illustrating timing of the mean injection in dual fuel mode at low load and a high load.

To ignite the natural gas in the combustion chambers of the internal combustion engine 1, a calculated quantity of diesel oil is additionally injected via the injection nozzles 24, said injection being divided into a pilot injection, a main injection and a post-injection as follows:

As illustrated in FIG. 3, the main injection always takes place before TDC of the respective cylinder of the internal combustion engine 1, being at about 15 degrees before TDC at low load (up to about 40% of the maximum possible torque) and at about 2 to 5 degrees before TDC at high load (greater than 80% of the maximum possible torque), with 70 to 90%, in particular approximately 80%, of the respectively required diesel oil being injected in the process.

A pilot injection for reducing the gradient of the pressure rise in the cylinders of the internal combustion engine and a post-injection (afterburning effect) for reducing soot components in the exhaust gas are furthermore carried out.

For control of injection in dual-substance mode, the two engine control units 28, 31 are appropriately interlinked in order to control both the supply of the substitute fuel (natural gas) and that of the diesel oil as a source of ignition in an appropriate manner.

Figure 2:
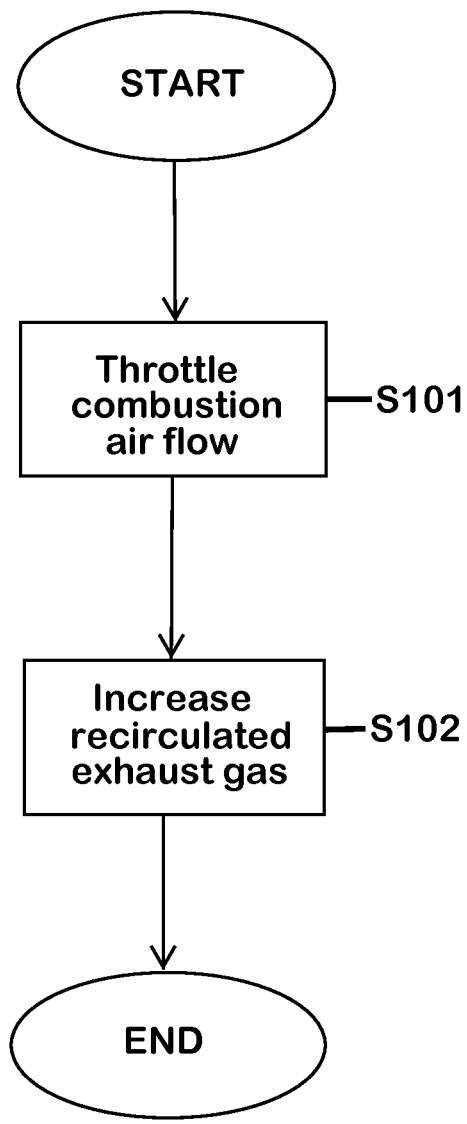
FIG. 2 is a flow diagram illustrating method steps according to an embodiment of the invention.

For this purpose, an electrically controllable throttle valve 37 is furthermore provided in the boost pressure line 8 upstream of the gas mixer 30. As shown in FIG. 2, the throttle valve throttles the combustion air flow in such a way, in accordance with the signal of a wide-band lambda probe 38, which is inserted into the exhaust line 15 downstream of exhaust turbine 2b, and of a temperature probe 39—which are connected to control unit 31—that the lambda value in the exhaust gas is greater than 1 and up to 1.3, in particular 1.05 (as is known, lambda=1 corresponds to a stoichiometric fuel/air ratio, while lambda 1.05 or > corresponds to lean-burn operation or an excess of air) step S101. The wide-band lambda probe 38 preferably has a measurement range of lambda 0.7 to 4.

The required admixture of diesel oil and of the alternative fuel or natural gas in dual-substance mode is accomplished by characteristic map control in the control units 28, 31 in accordance with the load signals, engine speed signals, temperature signals of temperature probes 39 and the recirculated exhaust gas fed in via the exhaust gas recirculation valve 22. The recirculated exhaust gas is increased in the dual-substance mode to a value of 40% and above as compared with single-substance mode in order to raise the exhaust gas temperature of the internal combustion engine 1, step S102.

For this purpose, the temperature of the recirculated exhaust gas can be increased further, if appropriate, either by short-circuiting the exhaust gas cooler 23 or by using recirculation lines 21 of different lengths (not shown), in which the exhaust gas loses a greater or lesser quantity of heat energy. If appropriate, the temperature of the combustion air in the boost pressure line 8 could furthermore be raised for this purpose by reducing or switching off cooling by means of the boost pressure cooler 9 (not shown).

In single-substance mode or in diesel-engine mode, preferably for starting the internal combustion engine 1 and in the cold operating range, injection of the liquid fuel is controlled in a conventional manner by means of engine control unit 28, and control of the boost pressure is furthermore also performed by activation of the bypass valve 18 and control of the exhaust gas recirculation rate is performed by means of the recirculation valve 22. The throttle valve 37 is continuously open.

Metering of the alternative fuel or natural gas, the required quantity of diesel oil as a source of ignition, control of the throttle valve 37 in accordance with the lambda values of the lambda probe 38 in the exhaust system and increased exhaust gas recirculation by appropriate activation of the recirculation valve 22 are controlled by means of the second engine control unit 31. Moreover, the bypass valve 18 is completely opened by means of the duty-cycle valve 19, as a result of which the boost pressure is reduced to a greater or lesser extent. Finally, the exhaust gas temperature of the internal combustion engine 1 is raised further, if appropriate, by reduced cooling in the recirculation line 21 and/or in the boost pressure line 8.

By means of these measures, nitrogen oxide emissions (NOx) and hydrocarbon emissions (HC) are significantly lowered. Moreover, the exhaust gas temperature is raised to such an extent by throttling the combustion air to said lambda value that the downstream oxidation catalysts 20 can perform rapidly initiated and effective conversion of the HC and CO components in the exhaust gas. It is also crucial here that the specified lambda value (slightly superstoichiometric fuel/air ratio) ensures that there is sufficient oxygen in the exhaust gas to allow oxidation of HC and CO to H2O and CO2.

The invention is not restricted to the illustrative embodiment described.

In particular, it is also possible to use other alternative fuels in gaseous or liquid form in the dual-substance mode of the internal combustion engine 1, the fuel feed device being designed appropriately for the alternative fuel.

The arrangement of the oxidation catalysts 20 and/or of the lambda probe 38 can also be different from that illustrated.

Instead of staged pressure charging by means of exhaust turbochargers 2 and 3, it is also possible to provide a simple exhaust turbocharging system or a compressor charging system.

In the case of staged pressure charging, as described, it is also possible, if appropriate, to provide two bypass valves 18 in two bypass lines 17, each short-circuiting one exhaust turbine (3b and 2b).

It would furthermore also be possible, instead of the feeding of the alternative fuel as described (single point) to perform cylinder-selective multipoint injection or gas injection into the cylinder-head intake ducts of the internal combustion engine 1.

The decisive factor is the process parameters by means of which, in the dual-substance mode of the internal combustion engine 1, lambda control of the air supply (by means of the throttle valve 37) is operated at about 1.05 and, at the same time, a significant increase in the exhaust gas recirculation rate to 40% or more is performed. This measure, if appropriate in combination with the other optional features proposed, leads to more rapidly initiated and more effective exhaust gas purification.

LIST OF REFERENCE SIGNS 1 internal combustion engine
2 exhaust turbocharger, low-pressure stage
2a compressor
2b exhaust turbine
3 exhaust turbocharger, high-pressure stage
3a compressor
3b exhaust turbine
4 intake line
5 air filter
6 intercooler
7 connecting line
8 boost pressure line
9 charge air cooler
10 intake manifold
11 water cooler
12 fan
13 exhaust manifold
14 exhaust line
15 exhaust line
16 silencer
17 bypass line
18 bypass valve
19 duty-cycle valve
20 oxidation catalysts
21 exhaust gas recirculation line
22 exhaust gas recirculation valve
23 exhaust gas recirculation cooler
24 injection valves
25 injection line
26 high-pressure pump
27 liquid fuel tank
28 engine control unit
29 accelerator pedal
30 annular-gap gas mixer
31 engine control unit
32 gas line
33 shut-off valves
34 pressure relief valve
35 gas pressure regulator
36 high-pressure tanks
37 throttle valve
38 lambda probe
39 temperature probes

The invention claimed is:

1. A method for operating an auto-ignition internal combustion engine that is operable in a single-substance mode in which the internal combustion engine is supplied with self-igniting liquid fuel, and a dual-substance mode in which the internal combustion engine is supplied with the liquid fuel as an ignition agent and natural gas, the internal combustion engine including combustion chambers, an injection device introducing liquid fuel into the combustion chambers, a pressure-charging device in an intake system precompressing combustion air for controlling a boost pressure, a feed device introducing the natural gas into the intake system in the dual-substance mode, an exhaust gas recirculation device that recirculates exhaust gases from the internal combustion engine into the intake system via an exhaust gas recirculation valve, at least one electronic control unit metering in fuel quantities in accordance with at least one of operation-specific parameters and parameters relating to driving dynamics such that a required power and defined exhaust gas limits are achieved in conjunction with an exhaust gas purification device, the method comprising:
operating the internal combustion engine in the dual-substance mode at an increased exhaust gas recirculation rate relative to the single-substance mode; and
throttling, in the dual-substance mode, an air supply in the intake system such that a lambda value in exhaust gas of the internal combustion engine is in a range greater than 1 and up to 1.3,
wherein the steps of operating and throttling are performed to raise the temperature of the exhaust gas and ensure the presence of sufficient oxygen in the exhaust gas to allow oxidation of HC and CO to thereby ensure an effectiveness of oxidation catalysts in the exhaust gas purification device.

2. The method of claim 1, wherein the lambda value in exhaust gas of the internal combustion engine is in a range greater than 1 and up to 1.2.

3. The method of claim 2, wherein the lambda value in exhaust gas of the internal combustion engine is in a range of 1.03 up to 1.1.

4. The method of claim 1, wherein the step of throttling is accomplished by a throttle valve in the intake system controlled by a signal of a lambda probe arranged in an exhaust system of the internal combustion engine.

5. The method of claim 1, further comprising reducing to a predetermined extent the boost pressure of the pressure-charging device in the dual-substance mode.

6. The method of claim 1, wherein the pressure-charging device comprises at least one exhaust turbocharger with a bypass valve that bypasses an exhaust turbine of the at least one exhaust turbocharger, the method comprising controlling the boost pressure in a boost pressure line of the intake system in the single-substance mode, and opening the bypass valve to a predetermined extent in the dual-substance mode.

7. The method of claim 1, further comprising metering liquid fuel quantities in the dual-substance mode by dividing a fuel injection into a pilot injection and a main injection or into a pilot injection, a main injection, and a post injection, the main injection being carried out before a top dead center position of a respective cylinder.

8. The method claim 7, wherein the main injection occurs at least 15 degrees before top dead center of the respective cylinder in the dual-substance mode and at a low load of up to 40% of a maximum possible torque, and the main injection occurs at approximately 2 to 5 degrees before top dead center of the respective cylinder in the dual-substance mode and at a high load of greater than 80% of the maximum possible torque.

9. The method of claim 7, wherein 70% to 90% of a total required liquid fuel is injected during the main injection.

10. The method of claim 7, wherein 80% of a total required liquid fuel is injected during the main injection.

11. The method of claim 1, further comprising operating the internal combustion engine only in the single-substance mode during a cold-starting phase and at idle.

12. The method of claim 1, further comprising cooling exhaust gases of the exhaust gas recirculation system entering the intake system in the single-substance mode, and increasing a temperature of the recirculated exhaust gas relative thereto in the dual-substance mode by reducing a cooling function of a cooler in a recirculation line of the exhaust gas recirculation device.

13. The method of claim 1, further comprising reducing or interrupting a cooling function of a charge air cooler of the internal combustion engine in the dual-substance mode.

14. An internal combustion engine that is operable in a single-substance mode in which the internal combustion engine is supplied with self-igniting liquid fuel, and a dual-substance mode in which the internal combustion engine is supplied with the liquid fuel as an ignition agent and natural gas, the internal combustion engine comprising:
 combustion chambers;
 an injection device introducing the liquid fuel into the combustion chambers;
 at least one exhaust turbo charger in an intake system precompressing combustion air for controlling a boost pressure;
 a feed device introducing the natural gas into the intake system in the dual-substance mode;
 an exhaust gas recirculation device that recirculates exhaust gases from the internal combustion engine into the intake system via an exhaust gas recirculation valve;
 at least one electronic control unit metering in fuel quantities in accordance with at least one of operation-specific parameters and parameters relating to driving dynamics such that a required power and defined exhaust gas limits are achieved in conjunction with an exhaust gas purification device;
 wherein the exhaust gas recirculation device operates with an increased exhaust gas recirculation rate in the dual-substance mode relative to the single-substance mode; and
 a throttle element in the intake system configured to throttle, in the dual-substance mode, an air supply in the intake system such that a lambda value in exhaust gas of the internal combustion engine is in a range greater than 1 and up to 1.3
 wherein the lambda value and the increased exhaust gas recirculation rate raise the temperature of the exhaust gas and ensure the presence of sufficient oxygen in the exhaust gas to allow oxidation of HC and CO to thereby ensure an effectiveness of oxidation catalysts in the exhaust gas purification device.

15. The internal combustion engine of claim 14, wherein a gas mixer is arranged downstream of the throttle element as an annular gap mixer around a common boost pressure line.

16. The internal combustion engine of claim 15, wherein an outlet of an exhaust gas recirculation line is integrated into the annular gap mixer.

17. The internal combustion engine of claim 14, wherein the at least one electronic control unit comprises a first electronic control unit controlling metering of the liquid fuel in the single-substance mode, the boost pressure, and the exhaust gas recirculation rate, and a second electronic control unit controlling metering of the liquid fuel and the natural gas, the throttle element in accordance with lambda values in the exhaust gas, the recirculation valve, and a bypass valve for reducing the boost pressure.

18. The internal combustion engine of claim 17, wherein the second electronic control unit further controls exhaust gas temperature using the exhaust gas recirculation device and cooling thereof.

19. The method of claim 1, wherein the exhaust gas purification device includes a methane oxidation catalyst, and the steps of operating and throttling are performed to raise the temperature of the exhaust gas to greater than 450° C. to thereby ensure an effectiveness of the methane oxidation catalyst.

* * * * *